(12) United States Patent
Kolada et al.

(10) Patent No.: US 8,127,605 B2
(45) Date of Patent: Mar. 6, 2012

(54) FOOD PRODUCT MEASURING VESSEL WITH INTEGRATED SCALE

(75) Inventors: Paul Kolada, Bexley, OH (US); Chris Daniels, Columbus, OH (US); J. Ryan Eder, Columbus, OH (US)

(73) Assignee: Priority Worx, LLC, Columbus, OH (US)

( * ) Notice: Subject to any disclaimer, the term of this patent is extended or adjusted under 35 U.S.C. 154(b) by 208 days.

(21) Appl. No.: 12/470,519

(22) Filed: May 22, 2009

(65) Prior Publication Data

US 2010/0089152 A1 Apr. 15, 2010

Related U.S. Application Data

(60) Provisional application No. 61/104,464, filed on Oct. 10, 2008.

(51) Int. Cl.
*G01F 19/00* (2006.01)
(52) U.S. Cl. .............................. 73/426; 73/428
(58) Field of Classification Search ............... 73/426, 73/427, 428
See application file for complete search history.

(56) References Cited

U.S. PATENT DOCUMENTS

| | | | |
|---|---|---|---|
| 830,308 A | 9/1906 | Dietz | |
| D150,146 S | 7/1948 | Mandolf et al. | |
| 3,592,277 A | 7/1971 | Ackeret | |
| 3,872,936 A * | 3/1975 | Baumann et al. | 177/15 |
| D300,517 S | 4/1989 | Bankier et al. | |
| 4,840,239 A * | 6/1989 | Slagg | 177/25.14 |
| 5,044,453 A | 9/1991 | Bankier et al. | |
| 5,329,069 A | 7/1994 | Amsel et al. | |
| 5,423,781 A | 6/1995 | Alexander et al. | |
| 5,923,257 A | 7/1999 | Nolte | |
| 6,236,001 B1 | 5/2001 | Shymko | |
| 6,605,947 B2 * | 8/2003 | Liao | 324/439 |
| 6,866,511 B1 | 3/2005 | Harris et al. | |
| 7,235,747 B1 | 6/2007 | Tribou | |
| 7,265,302 B2 | 9/2007 | Keech et al. | |
| 7,378,604 B2 | 5/2008 | Truong | |
| 2005/0217369 A1 * | 10/2005 | Holappa et al. | 73/304 C |
| 2006/0266563 A1 | 11/2006 | Kaplan | |
| 2008/0184788 A1 | 8/2008 | Jeong et al. | |

FOREIGN PATENT DOCUMENTS

JP 2004198108 A * 7/2004

* cited by examiner

*Primary Examiner* — Hezron E Williams
*Assistant Examiner* — Nathaniel Kolb
(74) *Attorney, Agent, or Firm* — Jason H. Foster; Kremblas & Foster

(57) ABSTRACT

The present invention comprises a portable measuring vessel with a removably attached digital measuring device. The digital measuring device includes one or more load cells, one or more processors, an input unit, and an output unit. Preferably the input unit is one or more finger-actuatable switches and the output unit is a visual display, such as an LCD. The processor is connected to the input, output, load cell and power source, thereby making a convenient, portable and easily used product.

27 Claims, 15 Drawing Sheets

FOOD PRODUCT MEASURING VESSEL WITH INTEGRATED SCALE

(b) CROSS-REFERENCES TO RELATED APPLICATIONS

This application claims the benefit of U.S. Provisional Application No. 61/104,464 filed Oct. 10, 2008, which is incorporated herein by reference.

(c) STATEMENT REGARDING FEDERALLY-SPONSORED RESEARCH AND DEVELOPMENT (Not Applicable)

(d) REFERENCE TO AN APPENDIX (Not Applicable)

(e) BACKGROUND OF THE INVENTION

1. Field of the Invention

This invention relates generally to the field of measuring devices, and more particularly to a food measuring vessel with a digital weighing and/or measuring device incorporated into the vessel.

2. Description of the Related Art

The measuring cup is an essential tool found in almost every kitchen. Traditional measuring cups have indicia marked upon the measuring cup wall in a manner that sometimes makes the indicia difficult to read. Whether the indicia can be read easily depends upon the lighting of the kitchen, the size and color of the indicia, the materials of which the measuring cup is made and the physical condition of the user. In order to read the volume of the contents of a measuring cup, a user must peer over the upper edge of the measuring cup, or through a transparent or translucent wall thereof, to view the top level of the contents. The user must also stoop to the measuring cup's level, if the cup is on a counter or table, or lift the measuring cup to eye level. Most of the measuring cups on the market have markings (volume indicia) that are difficult to read. Even with 20/20 vision, it can be a challenge for a user to determine the measurement of the contents.

Moreover, this method of reading the volume of contents inside the measuring cup may be very difficult for users with bad knees, a bad back or arthritis. For example, such people may have substantial difficulty stooping over to read the volume of contents in a measuring cup placed on a level surface, and may also have similar difficulty lifting a measuring cup to eye level. Lifting a measuring cup requires the dexterity to grip the cup and the strength and stability to hold the cup still and level in order to read the volume of contents held therein. An unsteady hand may spill contents or drop the measuring cup when attempting to lift and hold the cup at eye level.

In addition to measuring the volume of a material, a user may need to measure the mass (weight) of the material or an ingredient. The user may not be able to find a scale to measure the weight of the cup and its contents. Even if the user finds a scale, in order to obtain the weight of the contents alone, the user must obtain the combined weight of the cup and its contents and then subtract the weight of the empty cup. If the user forgets to measure the weight of the empty measuring cup before putting the contents into the cup, the user must pour out the contents to obtain the weight of the measuring cup. The user also faces more cleanup after using the scale.

In summary, the inability to decipher or read the volume markings and the additional trouble of measuring the desired weight hinder workflow, promote inaccurate measurements, and negatively impact the cooking experience. It is an object of the present invention to take the guesswork, physical constraints, and extra cleaning out of the measuring step of food preparation. The object of the present invention is to provide a measuring device having the capabilities of several kitchen tools in a wet and messy food preparation environment that has little effect on the device's function.

(f) BRIEF SUMMARY OF THE INVENTION

Embodiments of the invention address some or all of the concerns with the prior art. Products according to the invention are simple to manufacture and relatively inexpensive. Using the present invention, people face fewer distractions and hindrances, and less cleanup in the process of cooking, baking or other food preparation.

The present invention provides for a food-containing vessel with an integrated, mass-sensing (weight-measuring) scale. Users can conveniently place food material in the vessel through an opening in the top, such as by pouring. The vessel is capable of containing solid, liquid, particulate or paste materials, such as are normally encountered in food preparation, or a combination of several of these. The invention further includes a processor to convert a weight measurement to volume based on information about the food material input by a user. An output unit permits the user to perceive the volume and/or weight of the material accurately and easily.

The scale preferably comprises one or more load cells as the mass sensor. The scale can further comprise a processor to convert the weight measurement from the load cell to a volumetric measurement based on user inputs regarding the material being weighed, and data regarding material densities stored in the invention.

One embodiment of the present invention comprises the vessel capable of containing one or more food materials, a digital measuring component and one or more connectors that connect the digital measuring component to the vessel. In a preferred embodiment, the vessel is detachably connected to the digital measuring component, although the attachment can alternatively be permanent. The digital measuring component preferably comprises the load cell, an input unit wherein a user inputs characteristics of the material contents of the vessel and selects the desired measurement unit, one or more processor integrated circuits (which, along with any data storage means and software is collectively referred to as the "processor") and an output unit that displays the information from the electronic measuring unit in a form the user can perceive. Examples of the output unit include visual displays, tactile displays (e.g., generating Braille symbols) and a signal generating device, such as a chime, that humans can hear.

In the preferred embodiment, the digital measuring component further comprises a power source, which can be separate from or integral with, the processor or any other component of the digital measuring component. An optional shut-off feature can be included to extend the life of the power source. Preferably, the digital measuring component is sealed so that it is substantially waterproof and other liquid and particulate contaminants cannot readily penetrate the casing of the device.

The vessel in the present invention can be a measuring cup, a mixing bowl or any other open top container used for mixing or storage in food preparation. Preferably, the vessel is a measuring cup, and more preferably the vessel is made of a glass, plastic or ceramic material suitable for food preparation and storage. Most preferably, although not required, the vessel is made of 4,4'-(propan-2-ylidene) diphenol (BPA) free copolyester plastic, which can be transparent, or at least translucent.

In a preferred embodiment of the present invention, a handle with a nonslip grip is added to, or integral with, the vessel for ease of use. The input unit, the output unit, the processor and the power source can all be housed in the handle. The vessel and handle are connected to the digital measuring component through connectors that comprise one or more snaps, screws or other fasteners to mechanically attach the digital measuring component to the vessel. One or more gaskets are also included to seal any gaps between the digital measuring component and the vessel and one or more casings to enclose the load cell(s). The casing also allows for relative movements between the vessel and the portion of the load cell that contacts the surface upon which the device rests. One or more optional coverings are also included for the input unit, the output unit, the processor and/or the power source to reduce infiltration of food particles.

The input unit preferably comprises finger-actuatable keys, including a tare key which allows a user to "zero" the weight of the empty vessel prior to placing the contents into the chamber of the vessel. The input unit further comprises a mode key that enables a user to choose between different display modes, and a unit key that allows the user to choose between units of mass or weight (e.g., Metric and Imperial units).

The load cell preferably comprises a weight-to-electronic-signal electromechanical transducer, which can include one or more strain gauges. Preferably, the load cell is located at a base of the device and is waterproof. Furthermore, the load cell, or another constituent of the digital measuring component can include an analog-to-digital converter to convert analog electronic signals to digital signals to be displayed on a digital display screen of the output unit.

The processor converts a signal from the load cell (or an analog-to-digital converter) to a volume measurement using the information about the food material in the vessel. The volume information and/or the weight information is conveyed to the output unit to be displayed to the user. Preferably, the processor is placed in the handle and is waterproof.

The output unit comprises one or more display screens that are preferably waterproof. The display screen can be a liquid crystal display (LCD) with a polycarbonate lens, but can alternatively be an electroluminescent (EL) display. The output unit can alternatively or additionally be an audible mechanism to alert the user when the desired measurement is reached, to inform the user about the measurement information of the contents of the vessel and/or to alert the user as portions of the desired measurement are reached, such as when predetermined fractions of a cup or milliliter are reached as material is being added. Any other output device can be substituted for the visual display or audible signal, so long as it can be perceived by, such as by one or more of the five senses of, humans. Furthermore, the visual display of the preferred embodiment can be positioned to display the output horizontally, vertically or any angle in between, so long as the user can perceive the displayed information.

This brief summary has been provided so that the nature of the invention may be understood quickly. A more complete understanding of the invention may be obtained by reference to the following description of the preferred embodiments thereof in connection with the attached drawings.

(g) BRIEF DESCRIPTION OF THE SEVERAL VIEWS OF THE DRAWINGS

Figure 1:
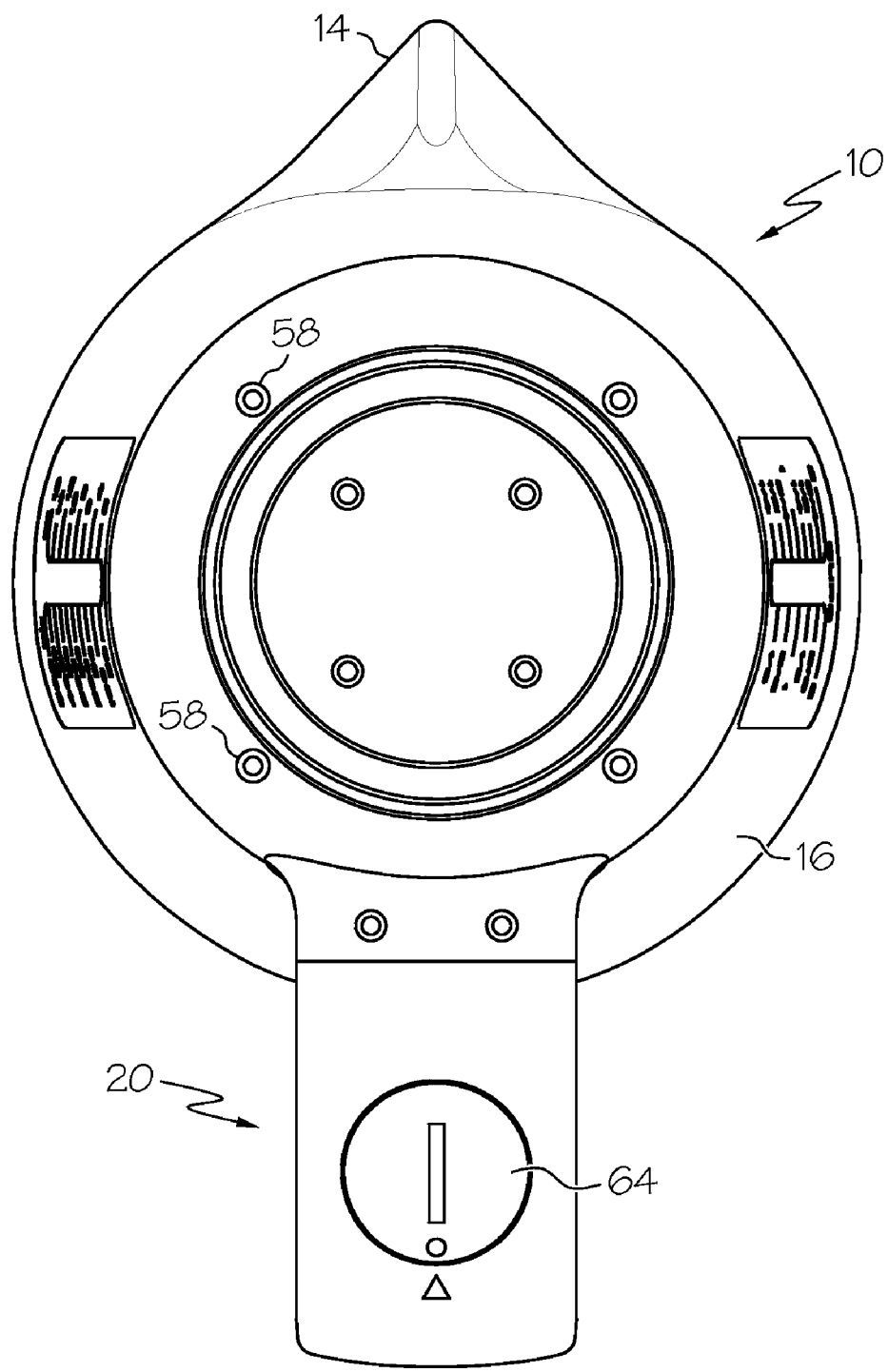
FIG. 1 is a bottom view illustrating a preferred embodiment of the present invention.
Figure 2:
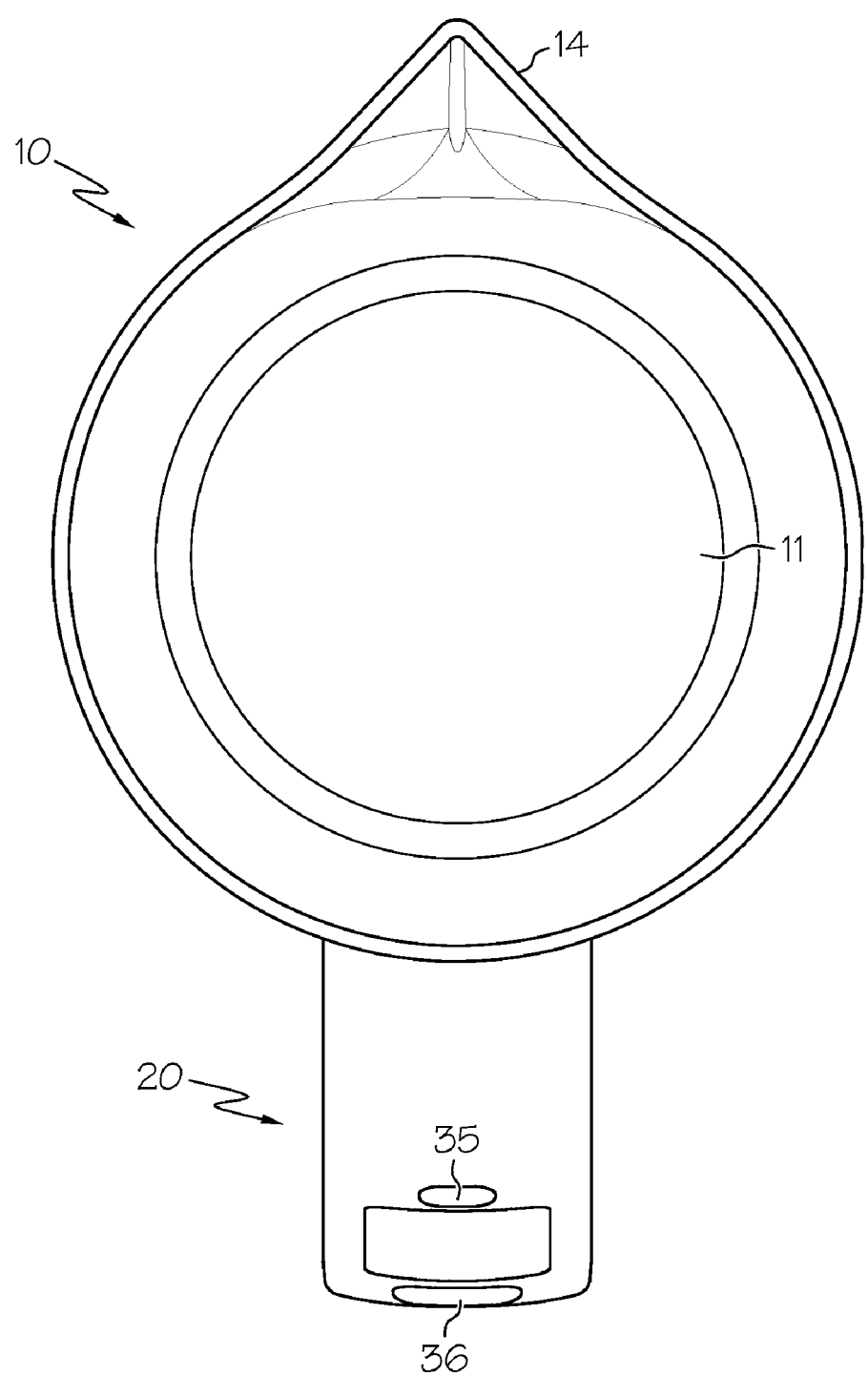
FIG. 2 is a top view illustrating a preferred embodiment as illustrated in FIG. 1, further showing an input unit and an output unit located on its handle.

In describing the preferred embodiment of the invention which is illustrated in the drawings, specific terminology will be resorted to for the sake of clarity. However, it is not intended that the invention be limited to the specific term so selected and it is to be understood that each specific term includes all technical equivalents which operate in a similar manner to accomplish a similar purpose. For example, the word connected or terms similar thereto are often used. They are not limited to direct connection, but include connection through other elements where such connection is recognized as being equivalent by those skilled in the art.

(h) DETAILED DESCRIPTION OF THE INVENTION

The preferred embodiment of the present invention has two main parts—the vessel 10 and a digital measuring component that includes several sub-components. The digital measuring component's sub-components include an input unit that allows a user to manually input characteristics of the material contained in the vessel and select a desired unit of measurement. Another sub-component is one or more mass sensors and one or more processors. An output unit is another sub-component and displays the weight information from the processor.

In a preferred embodiment, the digital measuring component includes a power source, which can be located adjacent to, or integral with, the processor, the load cell, the input unit or the output unit, all of which are electrically connected to the power source. The power source can be a battery or any other portable, lightweight power supply, such as a photovoltaic cell, a fuel cell, an alternating current source, such as household current, etc. An optional timed shut-off feature can be included in the digital measuring component, or the logic of the processor, to extend the life of the power source. Preferably, the digital measuring component is sealed and, therefore, substantially waterproof, makes it safe to be used in a wet kitchen environment and to submerge it in water for cleaning. In practice, some or all components of the digital measuring component can be removed from the vessel for high temperature and/or pressure or aggressive chemical washing of the vessel and other parts of the invention.

Figure 3:
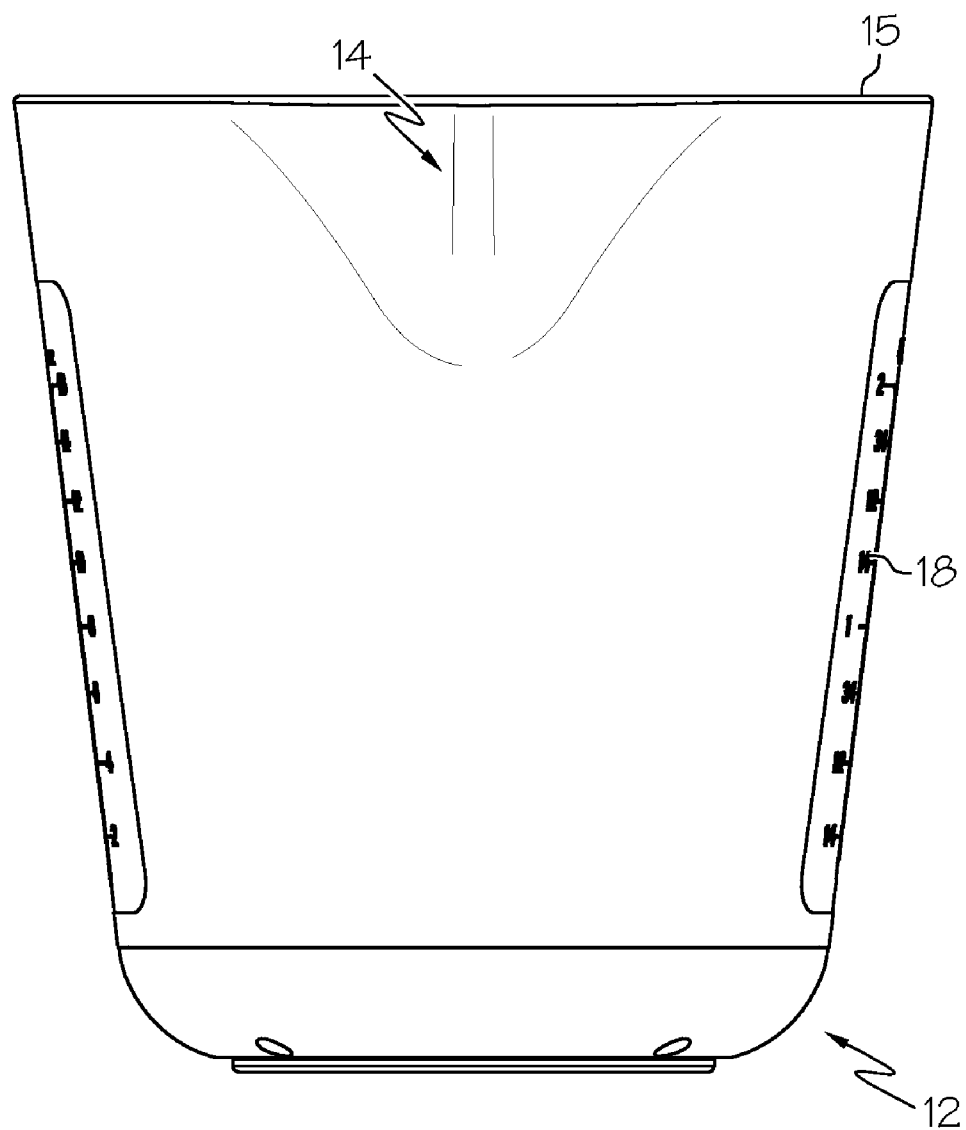
FIG. 3 is a front view illustrating a preferred embodiment as illustrated in FIGS. 1 and 2.

The preferred vessel of the present invention is a measuring cup, but it can be a mixing bowl or any other container used for mixing or storing of food. Preferably, the vessel 10 is a measuring cup in a range of 1-4 cups, but it is contemplated that the vessel can have a volume of up to two gallons. The vessel 10 has a sidewall 16 and a floor 11 defining an internal chamber that can receive food material through an open top defined by the upper edge of the preferably translucent wall 16. The vessel preferably has volumetric markings 18 upon the wall 16, and a pouring spout 14 at the edge of its mouth 15 (FIG. 3).

The vessel 10 is preferably made of 4,4'-(propan-2-ylidene) diphenol BPA-free copolyester plastic but can be any acceptable material. BPA is a hormone-disrupting chemical considered to be potentially harmful to human health and the environment. It is known that scratched and worn BPA plastic vessels will leach this BPA chemical into the contents of the vessels. BPA free plastic is used here to avoid potentially harmful effects. Further, a frosted texture can be applied to the exterior of the vessel 10 except to the display screen of the output unit and/or to the volumetric markings 18. This break in the texture helps eliminate reading confusion and provides an area of focus for reading the displayed measurement information and/or the volumetric markings.

The vessel 10 preferably has a detachable, hand-grippable handle 20 with a nonslip grip for ease of use. The nonslip grip is produced by a food contact safe thermal plastic elastomer (TPE) co-molded over polyester based plastic. The co-molded elastomer exterior can also eliminate unnecessary surface breaks to discourage bacteria growth.

The handle 20 can house the input unit, the output unit, the processor and a power source, such as the battery 60 as described below. The input unit, the output unit and the processor (which can be collectively referred to as the "input/output/processor unit") are preferably located in the handle 20. The input unit, the output unit and the processor can be located in parts of the vessel 10 other than the handle so long as the input/output/processor unit can be removed from the vessel 10 for cleaning at high temperature and/or under high or low pressure, or by aggressive chemicals. Other locations include within a void in the wall 16 of the vessel 10, a shell covering the vessel 10 or the base 12.

Figure 4:
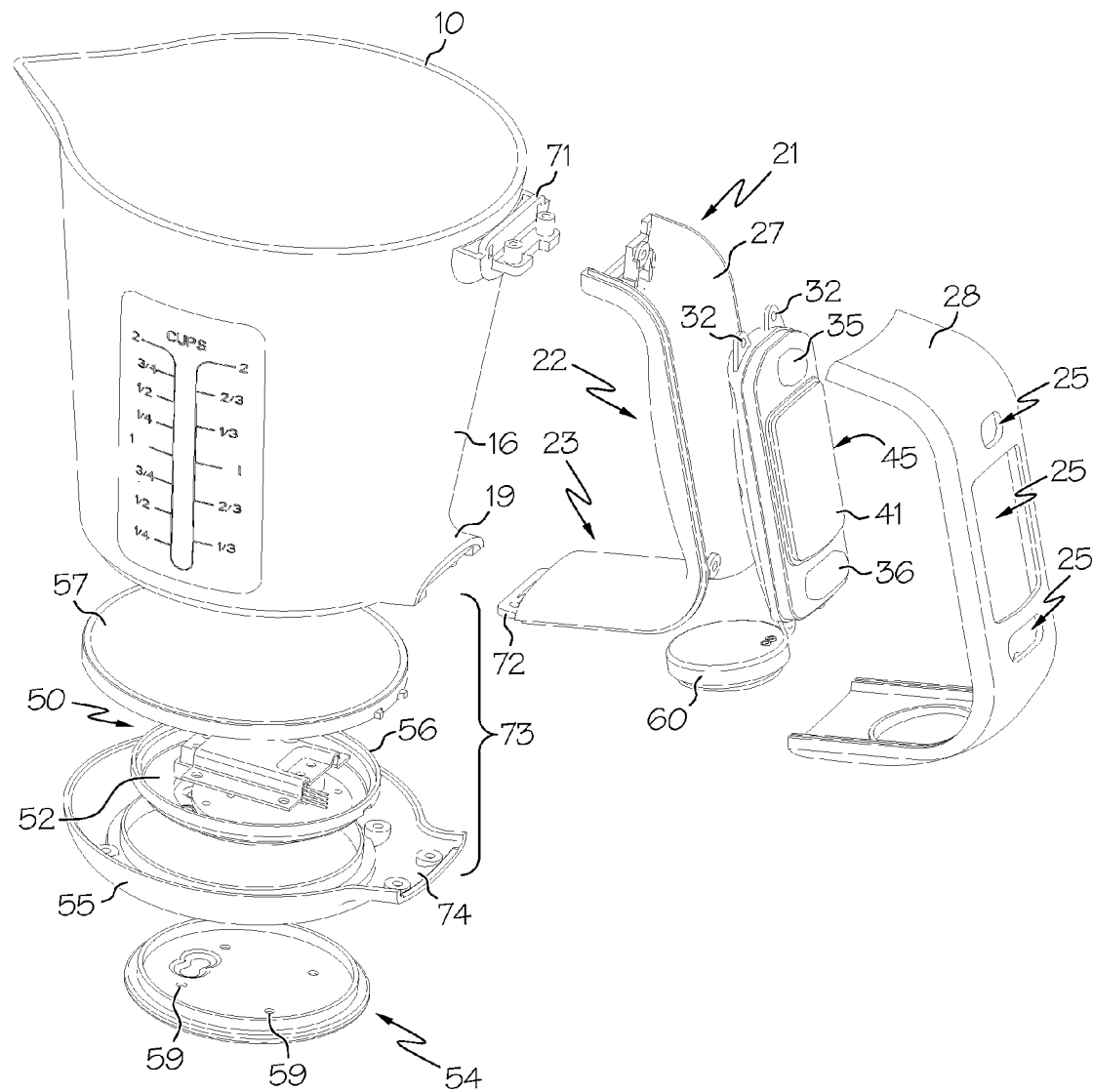
FIG. 4 is an exploded perspective view illustrating a preferred embodiment as illustrated in FIGS. 1 and 2.
Figure 5:
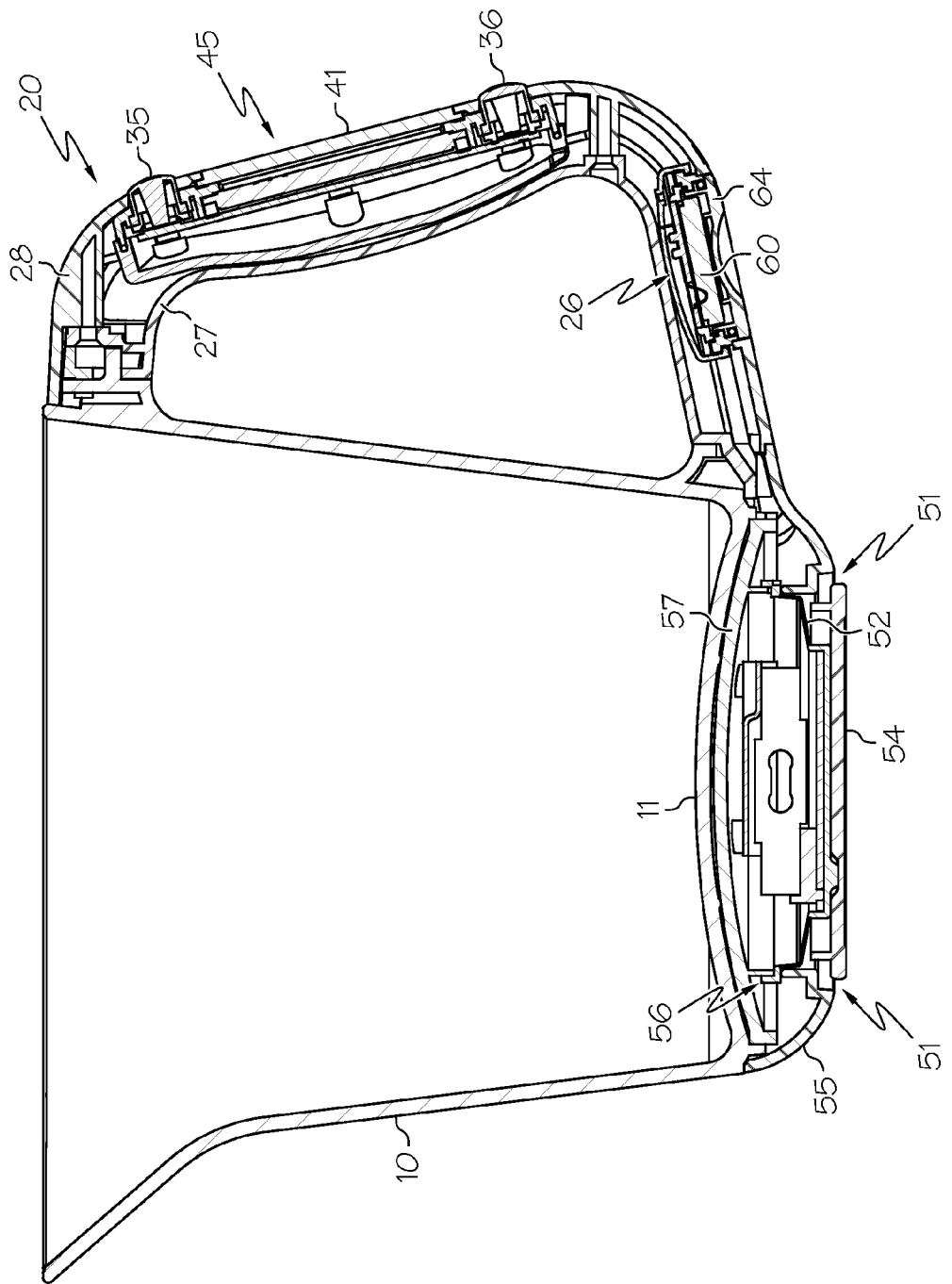
FIG. 5 is a side view in section illustrating a preferred embodiment as illustrated in FIGS. 1 and 2.

The input/output/processor unit is preferably unified in one structure, which is referred to as the "input/output/processor unit 45" or "unit 45" (FIG. 4). The unit 45 is preferably removably mounted inside a middle portion 22 of the handle 20 between an inner handle piece 27 and an outer handle piece 28, as shown in FIGS. 4-5. Of course, the output display, or any portion thereof, can be positioned elsewhere on the apparatus than the handle 20.

In the preferred embodiment shown in FIG. 4, the unit 45 is removably attached to the inner piece 27 of the handle through four conventional fasteners 32, two of which are attached to corresponding protrusions on the top of the inner piece 27, and two of which are attached to corresponding protrusions on the bottom of the inner piece 27. One or more apertures 25 on the outer piece 28 of the handle 20 are sized to allow the input keys 35 and 36 and an outer surface of the output screen 41 to protrude through the outer piece 28 of the handle 20. The input keys 35 and 36 and output screen 41 are thus flush with or slightly protruding from the outer surface of the outer piece 28 (see FIG. 5), allowing the user access to the input keys 35 and 36 while gripping the handle 20 and presenting the user clear visual display of the measurement information on the output screen 41. Preferably, a display portion of the output unit is located on the protruding portion of the output screen so that the display portion remains visible to a user when the user's hand is gripping the handle. Of course, the user need not be gripping the handle to use the keys 35 and 36, but the design permits the user to do so. One or more optional coverings can be used to protect and seal the input keys 35 and 36 and the output screen 41 against a wet and messy food preparation environment. Preferably, such coverings are thin and transparent.

The middle portion 22 of the handle 20 is preferably angled from vertical in order to clearly present the measurement information on the unit 45 to a user looking down on the unit 45 without requiring the user to hunch over or hold the measuring vessel steady at eye level to read the measurement. Optimally, the angle of the handle is preferably in the range of about 0 to about 90 degrees from vertical, i.e., at or between horizontal and vertical. More preferably, the handle is angled about 30 degrees from vertical.

Figure 13:
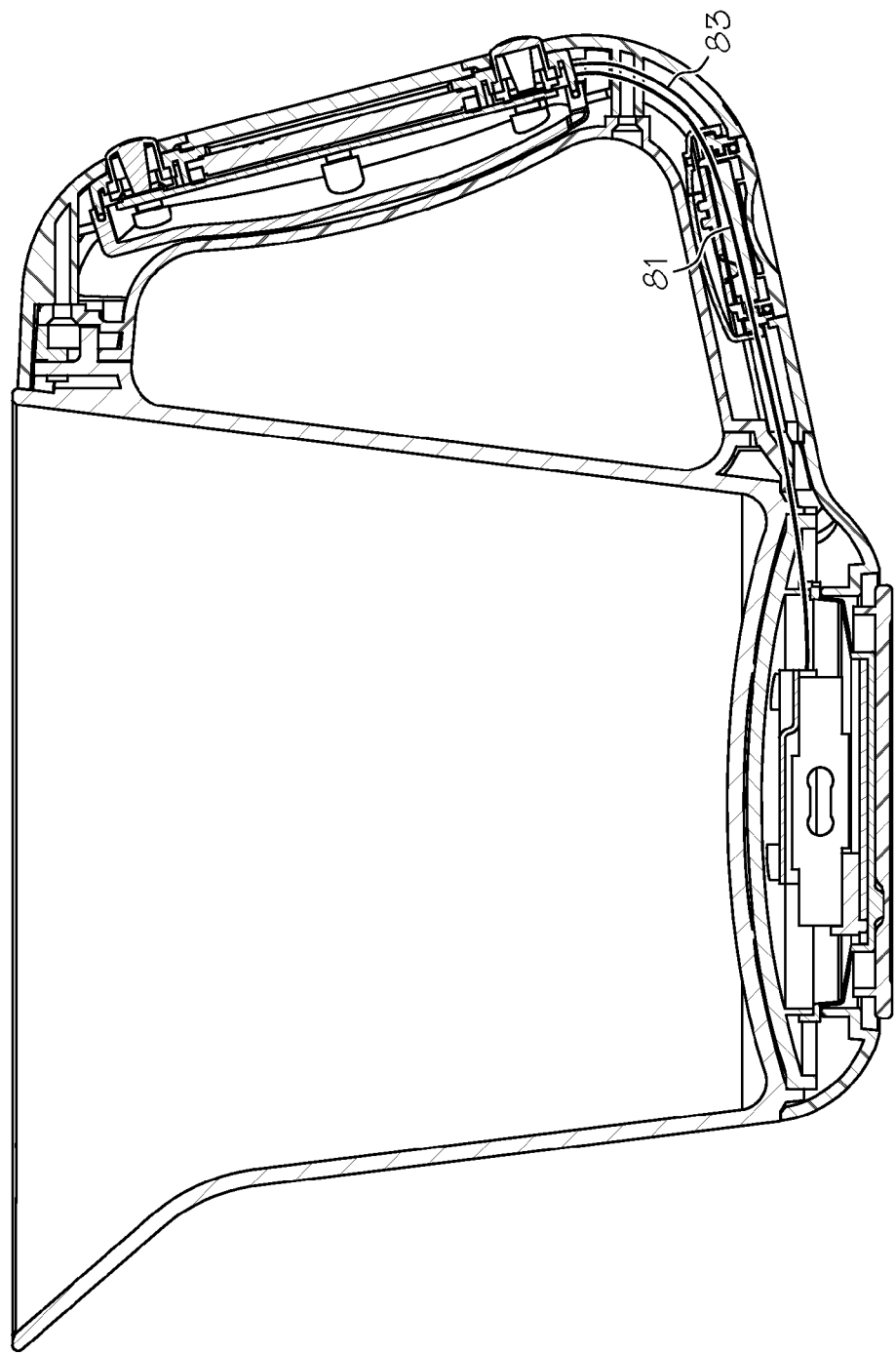
FIG. 13 is a side view in section illustrating a preferred embodiment as illustrated in FIGS. 1 and 2 and disclosing the locations of the electrical cables.
Figure 14:
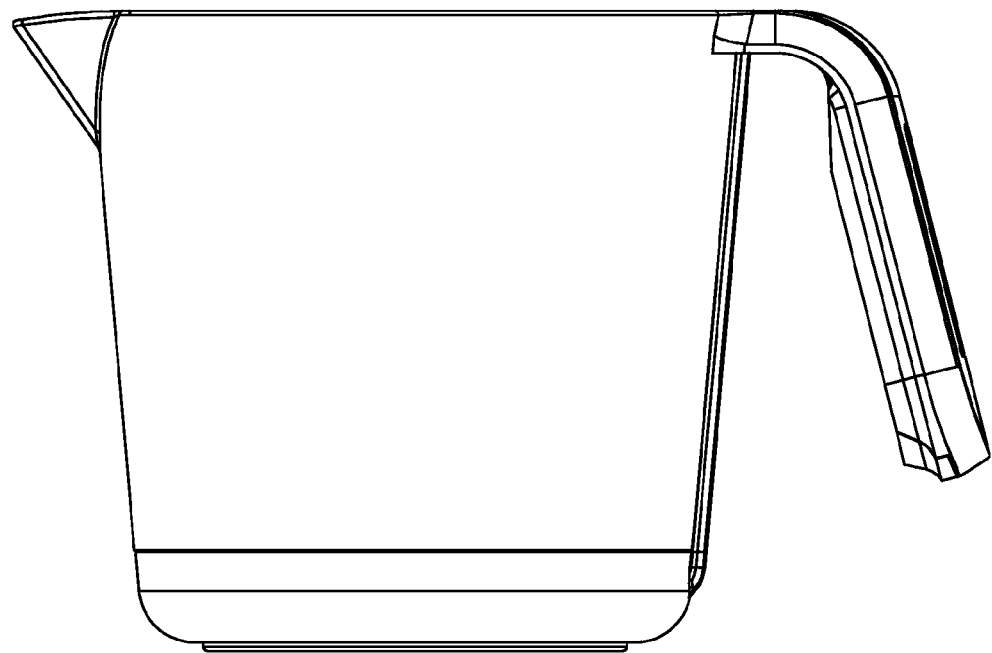
FIG. 14 is side view illustrating an alternative embodiment of the present invention.
Figure 15:
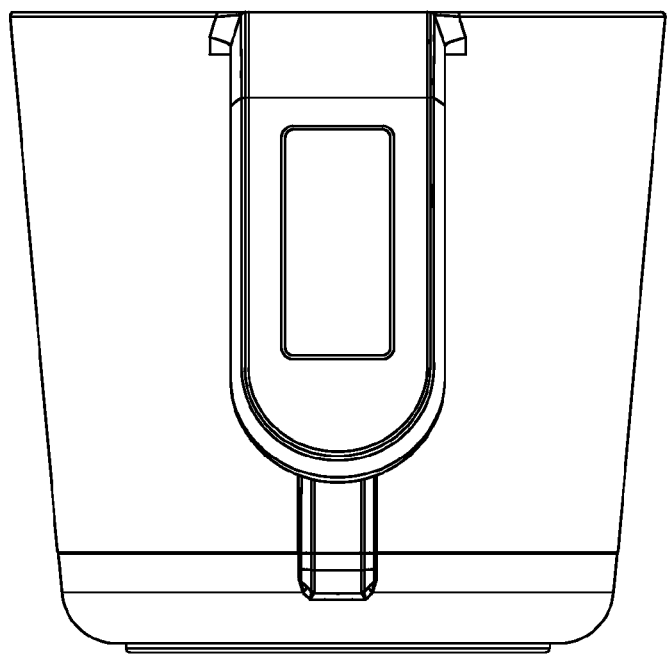
FIG. 15 is an end view illustrating the embodiment of FIG. 14.
Figure 16:
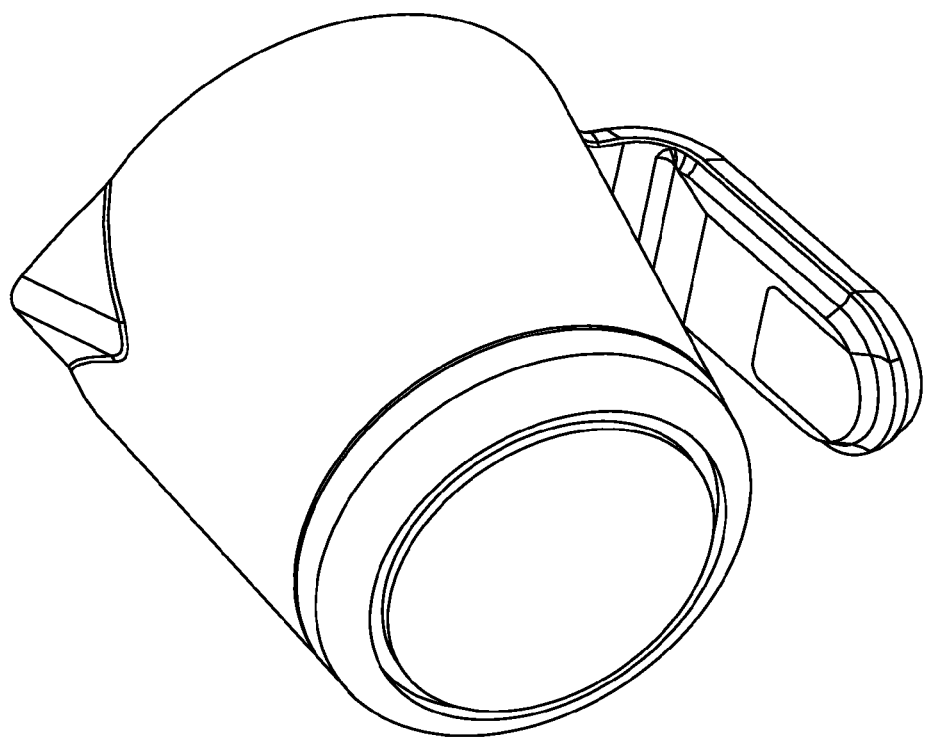
FIG. 16 is a lower perspective view illustrating the embodiment of FIG. 14.
Figure 17:
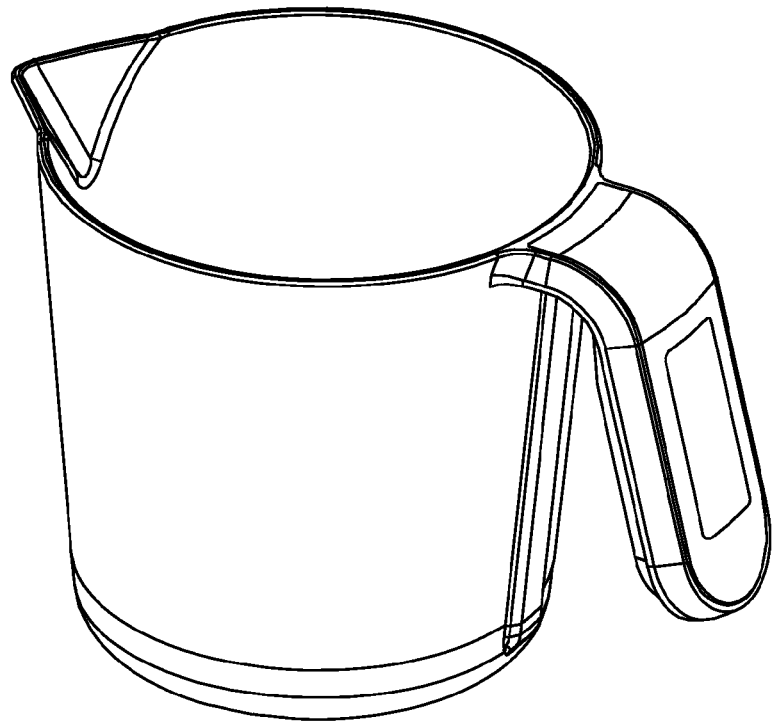
FIG. 17 is a top perspective view illustrating the embodiment of FIG. 14.

The battery 60 is preferably disposed in the bottom portion 23 of the handle 20, between the inner piece 27 and the outer piece 28. The battery 60 is preferably a circular, coin-shaped battery housed in a chamber 26 in the bottom portion 23 of the handle 20. The chamber 26 is sized to fit the battery 60 and is defined, in part, by the cap 64, which is preferably threadably mounted in the outer piece 28, flush with the outer surface thereof, to permit removal and replacement of the battery 60 for exchanging a new power source for an old exhausted one. Further, the battery 60 is sealed therein and waterproofed by one or more coverings or gaskets that inhibit particle and/or fluid infiltration into the handle 20. The battery 60 is preferably electrically connected to other components by a cable 83 (FIG. 13).

The detachable base 12 houses the load cell as described in more detail below. The handle 20 with the input/output/processor unit 45 can be removably attached to the wall 16 of the vessel 10 through the connector 71 and to the base 12 of the vessel through the connectors 72 and 73 (see FIG. 4). The connectors 71, 72 and 73 not only connect the handle 20 and the load cell pan 50 to the vessel 10, but include seals (not shown) that enable the digital measuring component to remain substantially untouched by liquid, particulate or other potentially damaging materials.

Figure 6:
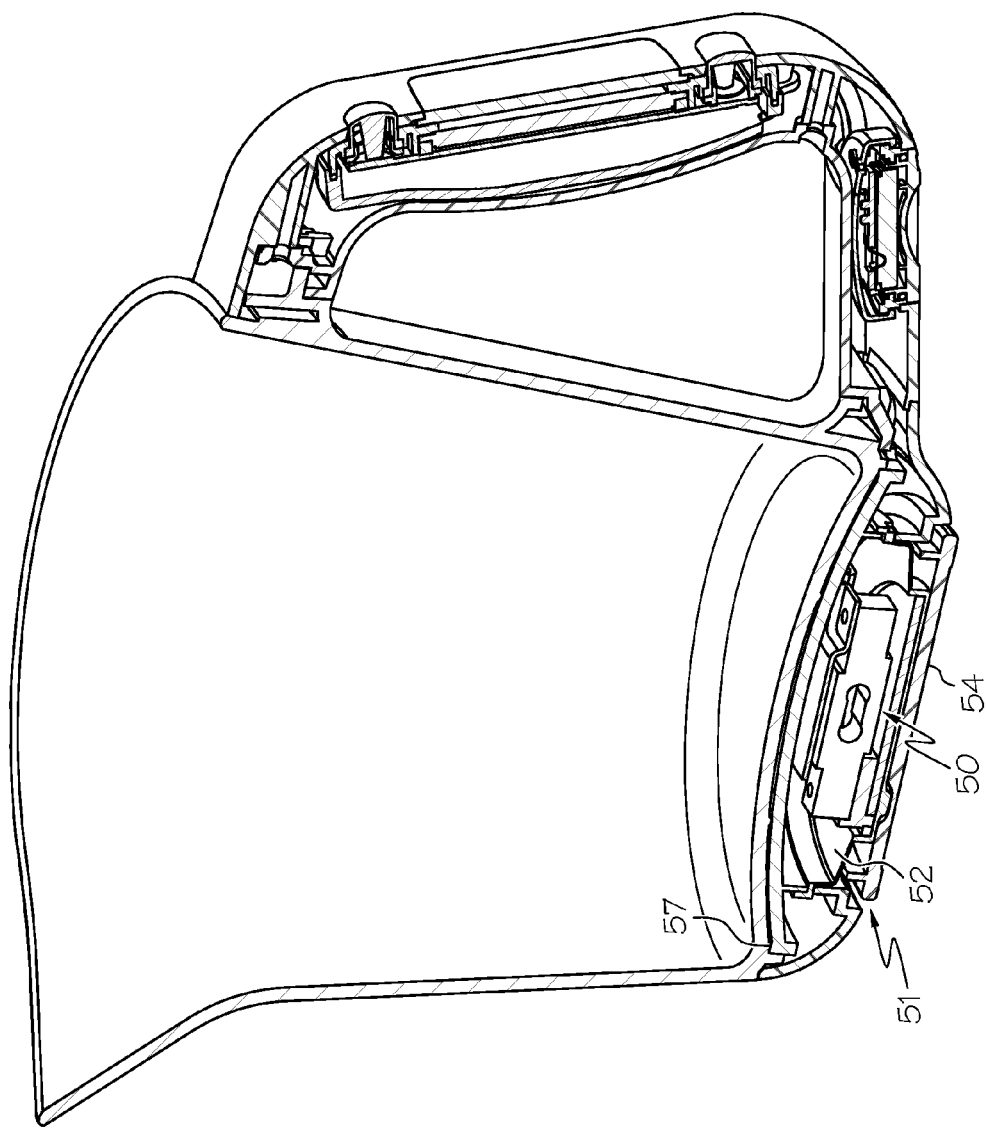
FIG. 6 is a perspective view in section illustrating a preferred embodiment as illustrated in FIGS. 1 and 2.

The load cell pan 50 (see FIGS. 4 and 6) is removably attached to the base 12. This can be accomplished after the handle 20 is assembled and attached to the vessel 10, or simultaneously with the attachment of the handle 20 to the vessel 10. The connector 73 comprises a flange 19 at a bottom (floor) 11 of the vessel 10 (see FIGS. 4 and 5), a casing 55 encircling the load cell pan 50 and having a flange 74 at the back edge of the casing 55, a flexible sealing gasket 57, and a bottom plate 54. An outer bell 56 of the load cell pan 50 is connected to and sealed against the bottom 11 of the vessel 10 through the gasket 57. The bottom plate 54 is secured to the inner region of the load cell pan 50 with four screws 58 (FIG. 1) that extend through the holes 59 (FIG. 4). The gasket 57 inside the casing 55 inhibits liquid and particles from entering the load cell area. In this way, the connector 73 seals the load cell from liquid or particle infiltration, and it provides a space 51 (see FIGS. 5 and 6) to permit the load cell to deform without substantial limitation when weight is added. Thus, relative movement between the vessel 10 and bottom plate 54 (which rests upon a support surface) is substantially uninhibited to allow for accurate mass sensing.

The load cell comprises a conventional weight-to-electronic-signal electromechanical transducer, which can include one or more strain gauges. Further, the load cell can include an analog-to-digital converter to convert analog electronic signals to digital signals that can be processed by the processor and then displayed on the digital display screen of the output unit. The load cell is preferably a conventional load cell with the strain gauges bonded onto the plate 52, which can deform without any substantial interference when weight is applied to the vessel 10. Any commercial transducer with one or more strain gauges, which can be arranged in a bridge circuit, can be used in the present invention so long as it is reasonably priced and light weight.

After the load cell pan 50 is connected to the bottom of the vessel 10, a cavity is formed by combining the flange 19 at the bottom of the vessel 10 with the flange 74 at the edge of the casing 55. The tab 72 at the bottom portion of the assembled handle 20 is slidably inserted into this corresponding cavity to connect the bottom portion 23 of the handle to the base 12. A connector 71 at a top portion 21 of the assembled handle 20 connects the top portion 21 to the wall 16 of the vessel 10.

While the handle 20 and base 12 are assembled and connected to the vessel 10, the cables and wires extending between the components (see FIG. 13) are re-connected in order to provide electrical power and the communication of signals between the sub-components of the digital measuring component. This preferably occurs by the automatic registration of electrical contacts that are separated when the portions of the housings are separated. Of course, these re-connections can occur before or after the handle and base are assembled and connected to the vessel. After these re-connections have been made, the measuring device can be used.

Figure 7:
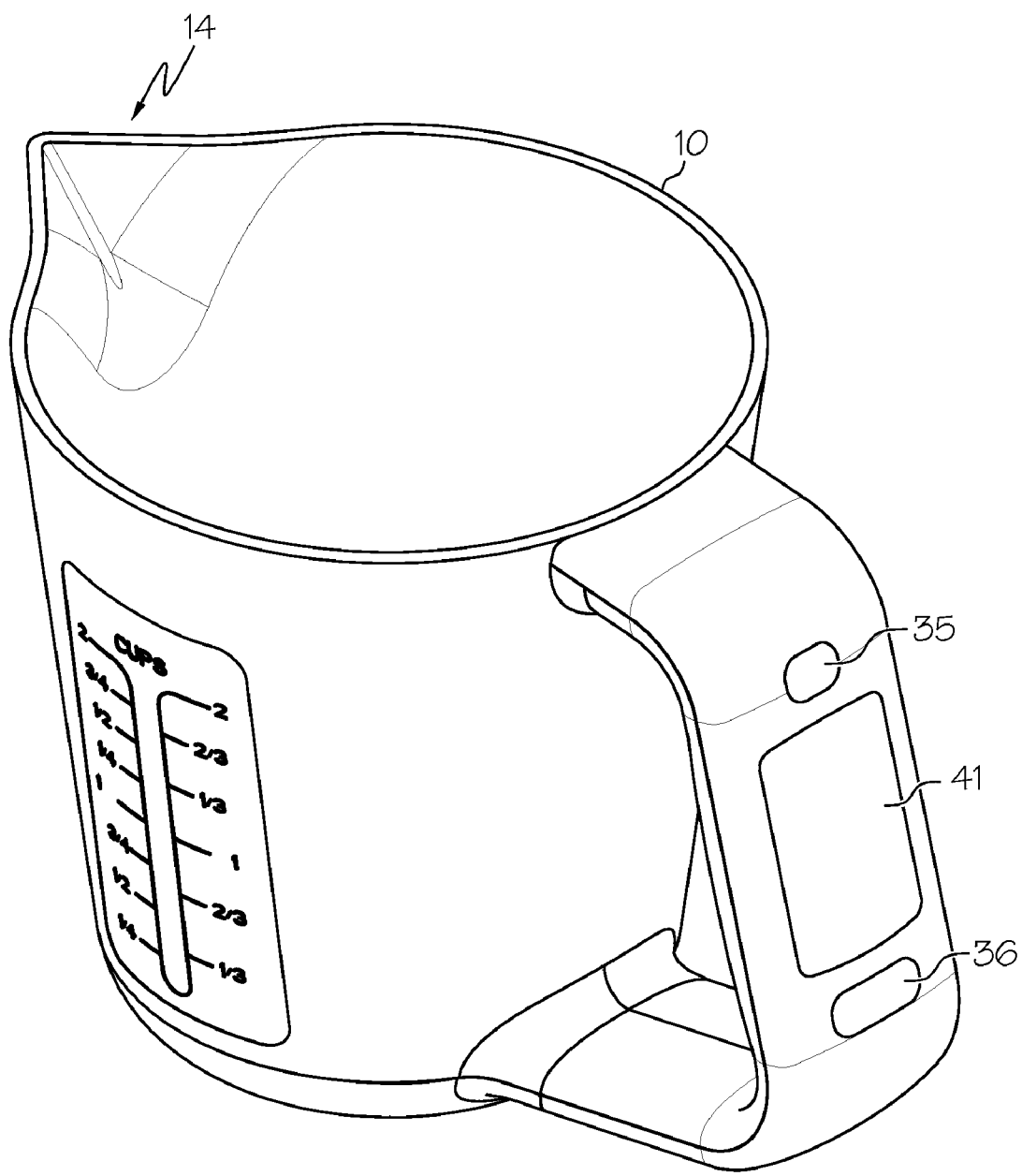
FIG. 7 is a perspective view illustrating a preferred embodiment as illustrated in FIGS. 1 and 2 in an upright position.
Figure 8:
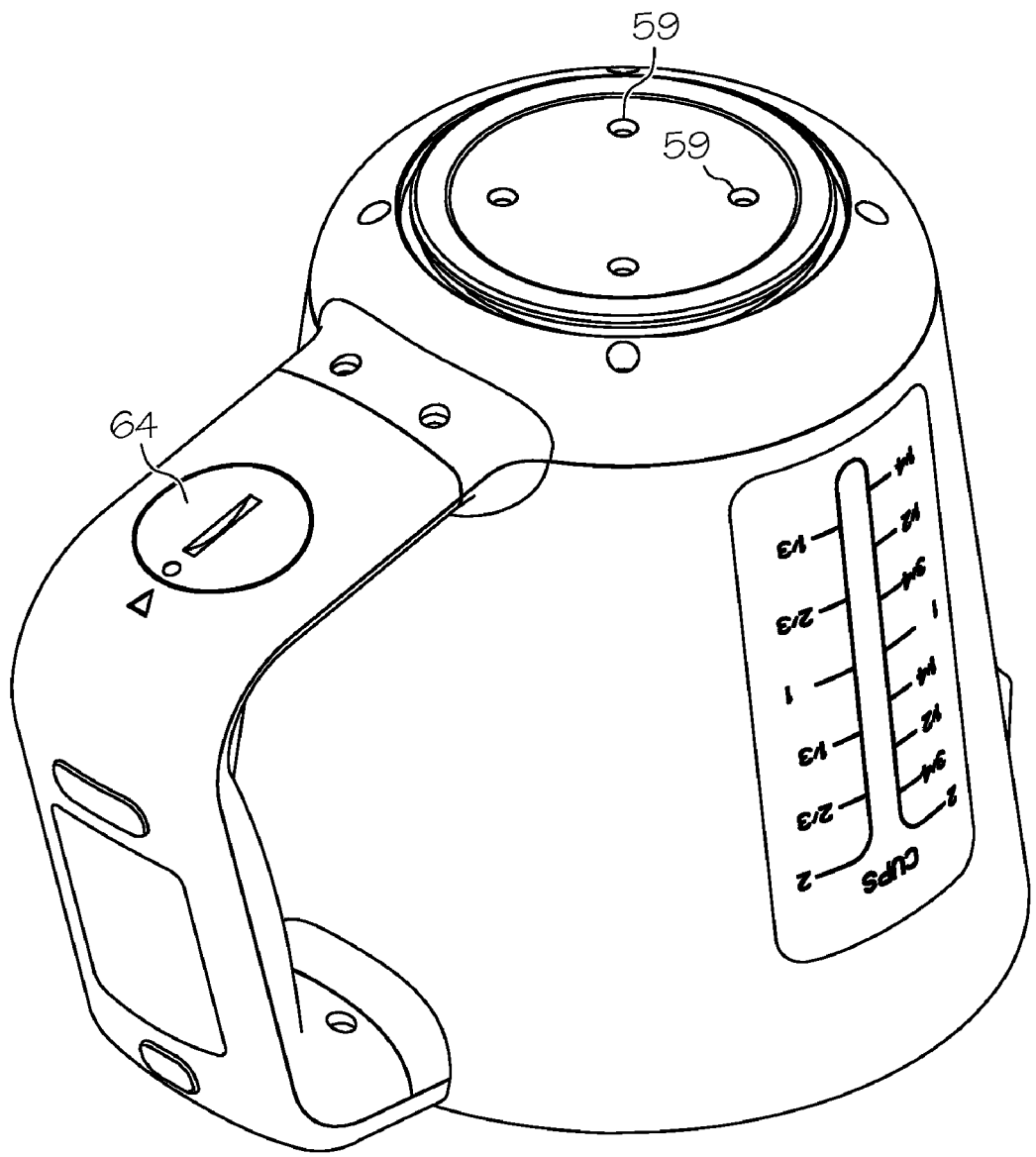
FIG. 8 is another perspective view illustrating a preferred embodiment as illustrated in FIGS. 1 and 2 in an upside down position.
Figure 9:
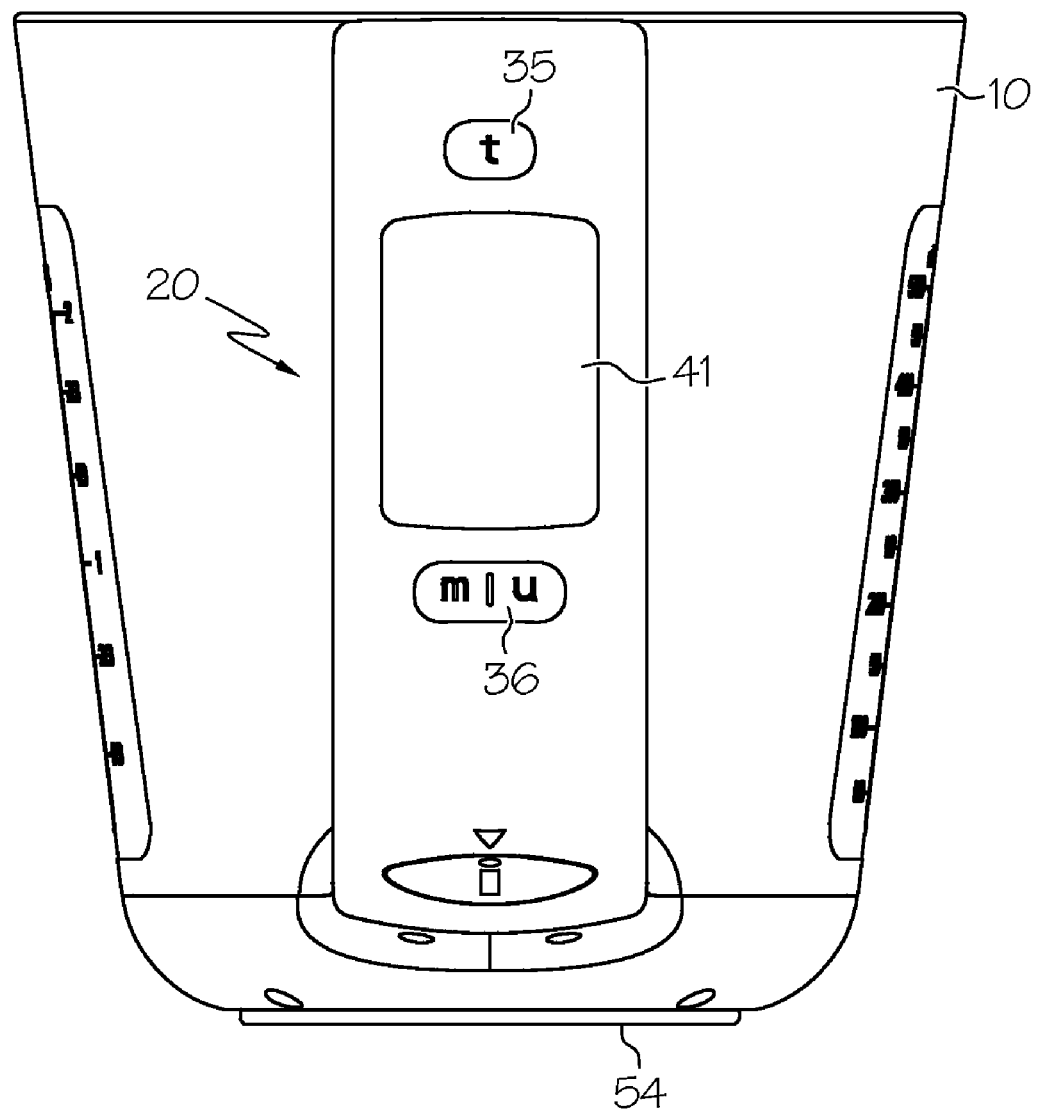
FIG. 9 is an end view illustrating a preferred embodiment as illustrated in FIGS. 1 and 2.
Figure 10:
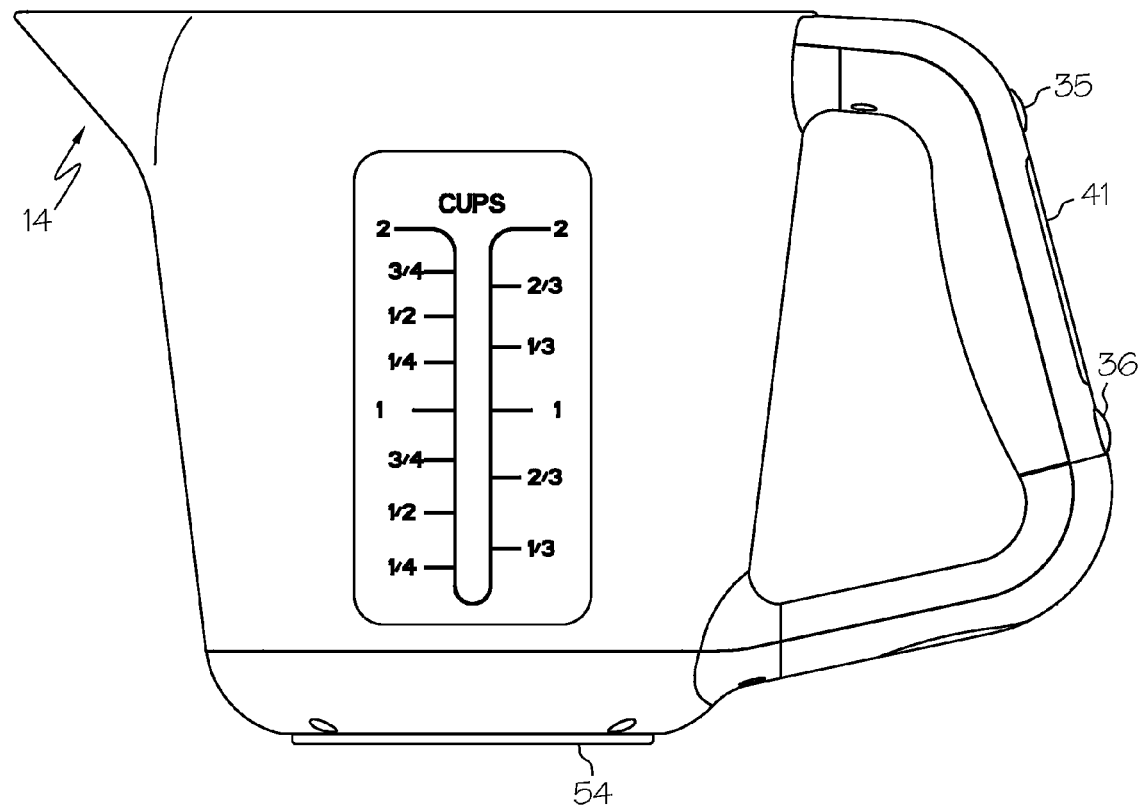
FIG. 10 is a side view illustrating a preferred embodiment as illustrated in FIGS. 1 and 2.

The preferred input unit comprises a tare key 35, which is in the form of a finger-depressible button that allows a user to zero the weight of the empty vessel 10. It further comprises a mode key and a unit key, which can also be finger-depressible buttons. The mode key enables a user to choose between different display modes while the unit key allows the user to choose between Metric and Imperial units of weight, volume, etc. The tare key 35, the mode key and the unit key are collectively referred to as "user interface" buttons or keys. Preferably, the tare key 35 is a square or circular protrusion with a "t" labeling on its center, although this is not critical. The mode key and the unit key are preferably unified into the input key 36 with an "m/u" labeling. Further, the tare key 35 can be placed above the output screen 41 (FIG. 7) to provide more prominence. The mode key and the unit key can be placed immediately below the output display 41 so that the user can easily view their choices on the output display 41 even while a finger or thumb is on the input key 36. Other shapes and placements for the user interface keys are also contemplated, and any number of keys can be used. Applicant contemplates icons, unique indicia, other letters and characters, depending upon the end user, in place of the "t" and the "m/u" preferred. Furthermore, other inputs, such as voice activation, wireless computer or keyboard connection, touch screen, etc., are also contemplated.

Figure 12:
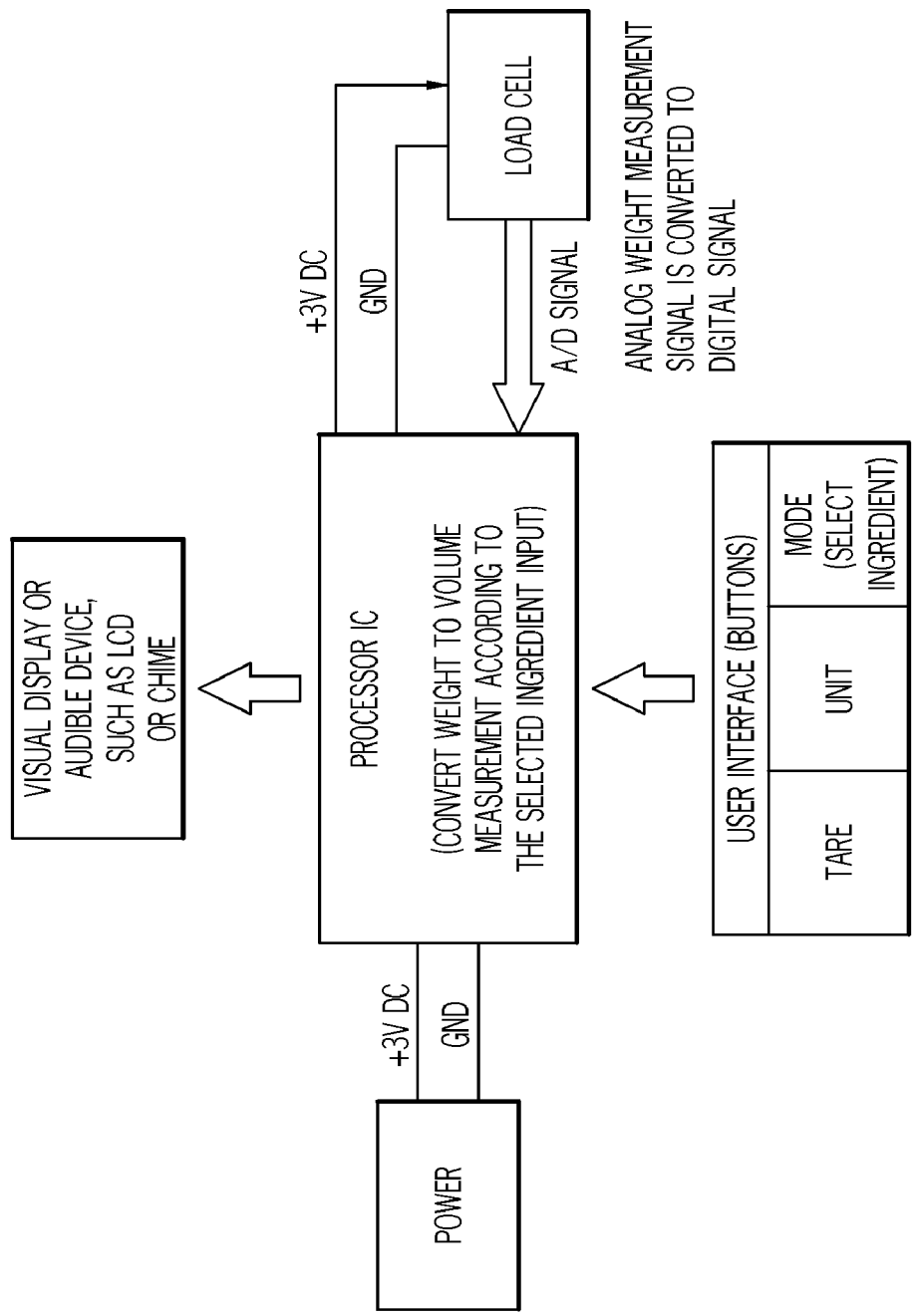
FIG. 12 is a schematic diagram illustrating a preferred electronic process of a digital measurement component.

FIG. 12 is a schematic diagram illustrating a preferred process of operating the digital measuring component. The input unit allows a user to input material information and to turn on the power. The signals from the input unit are conveyed to the processor and the load cell. The load cell then measures the weight of the contents in the vessel and converts it to analog (or digital) electronic signals, which are then converted to digital signals if necessary. The processor converts the electronic signals from the load cell (or converter) to volumetric signals based on the user input of the contents, known data for such contents (e.g., the density of water, oil, flour, peanut butter, and other ingredients) and conventional algorithms for converting mass to volume for a given material's density. The resulting digital measurement information is then conveyed to the output unit to be displayed to the user.

Figure 11:
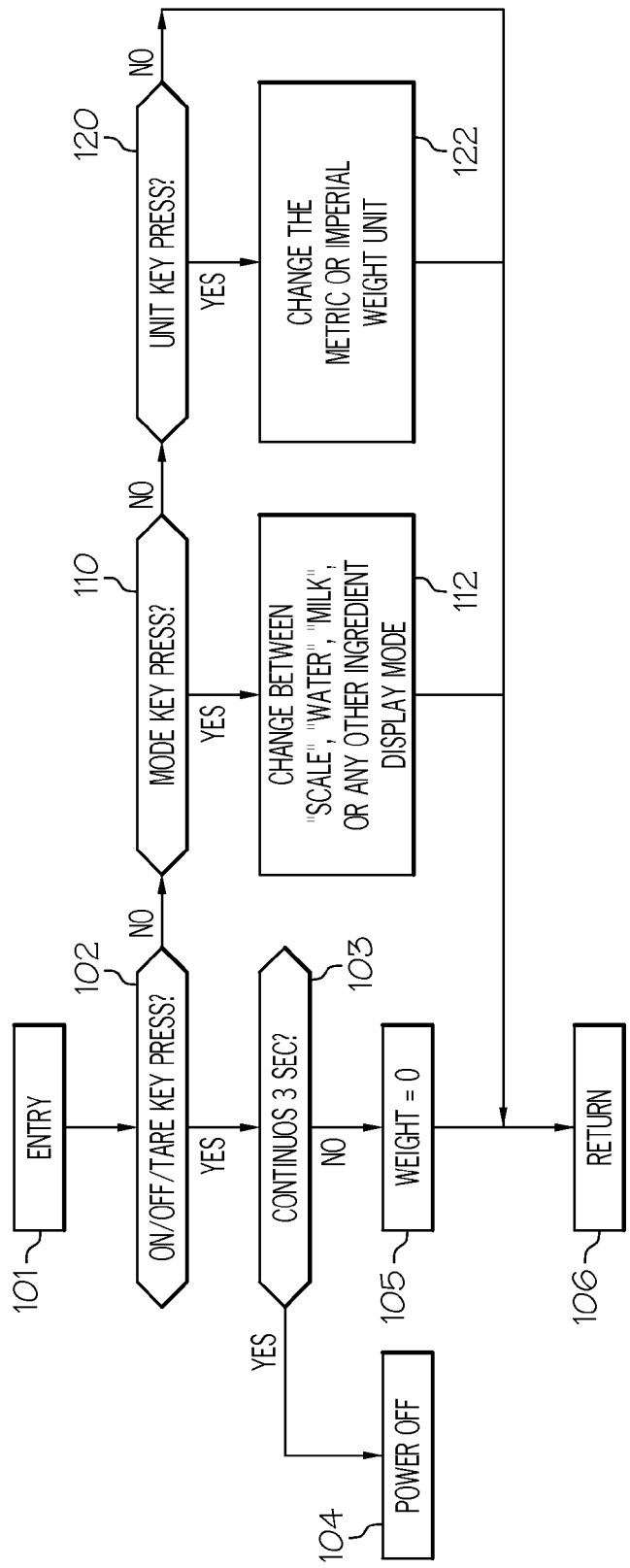
FIG. 11 is a flow diagram illustrating a preferred process of operating the tare key, the mode key and the unit key in an input unit for a preferred embodiment.

FIG. 11 illustrates a preferred method of operating the input unit keys. Entry (step 101) starts by pressing an on/off key to turn on the digital measuring component (step 102). The on/off key can also be any key described above or it can be a separate key or switch. If the on/off key and the tare key are unified into one key, pressing the tare key 35 once will turn on the digital measuring component; pressing the tare key 35 a second time will zero the load cell. In step 103, if the tare key 35 is pressed for more than 3 seconds, the whole digital measuring component is powered off (step 104). If the user decides not to press the tare key first or if the user has already pressed the tare key, he can proceed to step 110 by pressing the mode key, which enables the user to select between, for example, "scale," "water," "milk," "oil," "sugar", "flour" or any other display mode (step 112). More display modes may be made available for different ingredients or for a generic class of ingredients. If the user decides not to press the mode key, or when the user finishes selecting an appropriate display mode, the user can proceed to step 120 by pressing the unit key to choose units (step 122). Of course, the user has the choice of going back to press the mode key to select a different display mode (step 112), or going back to press the tare key (step 106) to zero the load cell.

Once the user has turned on the digital measuring component and input the characteristics of the material in the vessel, the load cell "measures" the weight of the materials in a conventional manner by sending an electronic analog or digital signal to the processor. It is preferred that the device, and more particularly the bottom plate 54, be resting upon a substantially level horizontal surface, such as a table, countertop, stove top or similar surface, during the measuring process. As food material is added to the vessel through the open top, such as by pouring the food into the chamber of the vessel 10, the bridge circuit of strain gauges in the load cell pan 50 produces an output voltage signal that is proportional to the weight of the contents in the measuring vessel 10. This signal is amplified by one or more amplifiers (not shown), and then the analog weight measurement electronic signal is converted to digital signals through one or more analog-to-digital converters. The digitized signal is transmitted by way of a plurality of electrical connecting cables, such as the data transmission cable 81 (FIG. 13) or wirelessly to the processor. The processor converts the amplified signal representing the weight measurement to a volume signal according to the selected ingredient input, data stored in a stable memory device relating to the density of the ingredient and a conventional algorithm for such conversion of mass and density to volume. The resulting digital volume signal is transmitted by way of a plurality of cables, such as the cable 81 (FIG. 13) to the output unit to display the measurement information to the user on the output display 41. Of course, the weight or mass signal can be displayed simultaneously with, or alternatively to, the volume.

In a preferred embodiment, the output display 41 comprises a digital display that preferably comprises one or more seven-segment bar displays or dot matrix displays. The output display 41 can comprise an electro-luminescent (EL) backlight duplex liquid crystal display (LCD) device. The LCD is preferably made of polycarbonate, but can be other suitable materials. This EL backlight LCD can be made at a reasonable cost and provides flexibility with a graphical user interface (GUI). The user should be able to clearly view the measurement at all angles with this high contrast backlight LCD. The output display 41 is preferably waterproof, which is very useful in a potentially wet food preparation environment. Furthermore, although the output display 41 is in a rectangular shape (FIG. 4), other shapes can alternatively be used, such as circular, square, or triangular shapes. It should also be noted that other displays and display locations, as described herein and as will become apparent to a person having ordinary skill in the art, are contemplated.

The output unit can alternatively comprise an audibly perceptible mechanism, such as a chime, with or without the visual display disclosed above, to alert the user when a desired measurement that was previously input to the input unit is reached and/or to communicate information about the material to the user, such as the exact measurement, for example by voice broadcast. To alert the user about when the measurement is accomplished, the audibly perceptible mechanism can (1) simply alert the user when each substantial marking is achieved; or (2) be pre-programmed to a desired measurement and then alert the user when the desired measurement is achieved. Any other human perceptible output device can be substituted for the visual display or audible signal, and include, but are not limited to, tactile signals (e.g., Braille), temperature changes, lights and wireless transmission, including emails.

Once the desired measurement is achieved, the food material is removed from the vessel 10, such as by pouring through the open top at the spout 14. Alternatively, the food material can be scooped out of the open top, such as with a spoon or spatula. Once this has occurred, the measuring device can be cleaned, or it can be re-used if a similar or compatible food product is added to the chamber of the vessel 10. The cleaning of the entire device can be accomplished by hand-washing the entire device, inside and out, and then drying or permitting it to drain dry. Alternatively, if the measuring device requires thorough cleaning, such as by high temperatures, high or low pressures, or by chemicals, any or all of which could damage any of the electronic components of the device, the digital measuring component (or the base 12 and/or handle 20 in the preferred embodiment described above) can first be removed, and then the parts of the device that can be cleaned in such a matter can be so cleaned. Then the parts can be reassembled so the device is useable again.

This detailed description in connection with the drawings is intended principally as a description of the presently preferred embodiments of the invention, and is not intended to represent the only form in which the present invention may be constructed or utilized. The description sets forth the designs, functions, means, and methods of implementing the invention in connection with the illustrated embodiments. It is to be understood, however, that the same or equivalent functions and features may be accomplished by different embodiments that are also intended to be encompassed within the spirit and scope of the invention and that various modifications may be adopted without departing from the invention or scope of the following claims.

The invention claimed is:

1. A portable measuring device for food preparation, the device comprising:
   a. a vessel having sidewalls and a floor that define a chamber capable of containing a food material, the sidewalls defining an open top that is adapted to permit the passage of the food material into the chamber;
   b. a base portion removably mounted to the vessel;
   c. a hand-grippable handle portion removably mounted to the vessel; and
   d. a digital measuring component in at least one of the portions removably mounted to the vessel and including
      i. an input unit adapted to permit human users to input information about the food material in the chamber;
      ii. at least one mass sensor for measuring the mass of at least the food material in the chamber;
      iii. at least one processor connected to said at least one mass sensor and the input unit; and
      iv. an output unit connected to the processor to output human-perceptible information related to the mass of the food material in the chamber to the user.

2. The portable measuring device according to claim 1, wherein the mass sensor is a load cell.

3. The portable measuring device according to claim 2, further comprising a power source connected to the input unit, output unit and processor.

4. The portable measuring device according to claim 2, wherein the input unit, the output unit and the processor are located in the handle portion.

5. The portable measuring device according to claim 4, wherein the power source is mounted in a void in the handle portion with a cap removably mounted over the void to permit access to the power source.

6. The portable measuring device according to claim 4, wherein the digital measuring component is substantially waterproof, at least one gasket is disposed in a gap between the digital measuring component and the vessel to mitigate entrance of contaminants to the gap, and the base portion encloses the load cell and permits relative movement between the vessel and a surface upon which the vessel rests.

7. The portable measuring device according to claim 6, wherein the input unit further comprises a tare key that enables a user to zero the weight of the vessel alone.

8. The portable measuring device according to claim 7, wherein the input unit further comprises a mode key that enables a user to choose between different display modes and a unit key that enables a user to choose between units of mass.

9. The portable measuring device according to claim 6, wherein the load cell is located in the base portion.

10. The portable measuring device according to claim 9, wherein the load cell is substantially waterproof.

11. The portable measuring device according to claim 6, wherein the processor is configured to convert a mass measurement received from the load cell to a volumetric measurement according to information about the food material input to the input unit.

12. The portable measuring device according to claim 6, wherein the output unit comprises at least one display screen.

13. The portable measuring device according to claim 6, wherein the output unit comprises an audible mechanism for creating human-perceptible alerts.

14. The portable measuring device according to claim 6, further comprising a display portion of the output unit protruding from the handle between the hand-grippable handle portion and the vessel, thereby remaining visible to a user when the user's hand is gripping the handle.

15. The portable measuring device according to claim 14, wherein the input unit further comprises finger-depressible buttons protruding from the handle between the hand-grippable handle portion and the vessel, thereby remaining accessible to a user's thumb when the user's hand is gripping the handle.

16. A portable measuring device for food preparation, the device comprising:
   a. a vessel having sidewalls and a floor that define a chamber containing a food material, the sidewalls defining an open top that permits the passage of the food material into the chamber;
   b. a base portion removably mounted to the vessel;
   c. a hand-grippable handle portion removably mounted to the vessel; and
   d. a digital measuring component in at least one of the portions removably mounted to the vessel and including
      i. an input unit through which a human user inputs information about the food material in the chamber;
      ii. at least one mass sensor for measuring the mass of at least the food material in the chamber;
      iii. at least one processor connected to said at least one mass sensor and said input unit; and
      iv. an output unit connected to the processor to output human-perceptible information related to the mass of the food material in the chamber to the user.

17. A method of using a portable measuring device for food preparation, the method comprising:
   a. placing a food material in a chamber of a vessel defined by sidewalls and a floor, the sidewalls defining an open top through which the food material is placed into the chamber;
   b. removably mounting a handle portion to the vessel;
   c. removably mounting a base portion to the vessel;
   d. mounting a digital measuring component in at least one of the portions removably mounted to the vessel, the digital measuring component including
      i. an input unit through which a human user inputs information about the food material;
      ii. at least one mass sensor for measuring the mass of at least the food material;
      iii. at least one processor connected to said at least one mass sensor and said input unit; and
      iv. an output unit connected to the processor to output human-perceptible information related to the mass of the food material to the user;
   e. inputting information about the food material to the input unit;
   f. disposing the measuring device on a substantially horizontal surface;
   g. sensing the mass of at least the food material; and
   h. displaying at least one characteristic of the food material on the output unit.

18. The method according to claim 17, further comprising the processor calculating the volume of the food material in the chamber based upon the mass of the food material and the density of the food material, and the output unit displaying the volume of the food material.

19. The method according to claim 18, wherein the digital measuring component is substantially waterproof, and further comprising submerging the portable measuring device in water for cleaning.

20. The method according to claim 19, further comprising separating the vessel from at least one of the portions.

21. The method according to claim 20, further comprising re-attaching the vessel to said at least one of the portions.

22. A portable measuring device for food preparation, the device comprising:
   a. a vessel having sidewalls and a floor that define a chamber for containing a food material, the sidewalls defining an open top that permits the passage of the food material into the chamber;
   b. a hand-grippable handle portion removably mounted to the vessel, the handle portion including an input unit through which a human user inputs information about the food material;
   c. a base portion removably mounted to the vessel and mounted to the handle portion, the base portion including at least one mass sensor for measuring the mass of at least the food material;
   d. at least one processor mounted in one of the portions and connected to said at least one mass sensor and said input unit, said processor configured to calculate at least the volume of the food material; and
   e. an output unit mounted in one of the portions and connected to the processor to output to a user human-perceptible information related to the volume of the food material;
   wherein the vessel is configured for removal from, and replacement to, the handle portion and base portion, and, when the vessel is mounted to the handle and base portions, to permit a human hand gripping the handle portion to simultaneously lift the handle portion, the base portion and the vessel as a unified structure.

23. A portable measuring device for food preparation, the device comprising:
   a. a vessel having sidewalls and a floor that define a chamber for containing a food material, the sidewalls defining an open top that permits the passage of the food material into the chamber;
   b. a hand-grippable handle portion removably mounted to the vessel;
   c. a base portion removably mounted to the vessel and mounted to the handle portion, the base portion including at least one mass sensor for measuring the mass of at least the food material;
   d. at least one processor mounted in one of the portions and connected to said at least one mass sensor, said processor configured to calculate at least the volume of the food material; and
   e. an output unit mounted in one of the portions and connected to the processor to output to a user human-perceptible information related to the volume of the food material;
   wherein the vessel is configured for removal from, and replacement to, the handle portion and base portion, and, when the vessel is mounted to the handle and base portions, to permit a human hand gripping the handle portion to simultaneously lift the handle portion, the base portion and the vessel as a unified structure.

24. A portable measuring device for food preparation, the device comprising:
   a. a vessel having sidewalls and a floor that define a chamber for containing a food material, the sidewalls defining an open top that permits the passage of the food material into the chamber;
   b. a base and a hand-grippable handle removably mounted to the vessel and including at least one mass sensor for measuring the mass of at least the food material and at least one processor connected to said at least one mass sensor, wherein said processor is configured to calculate at least the volume of the food material;
   c. an output display unit mounted to the handle and connected to the processor to display information related to the volume of the food material; and
   wherein the vessel is configured for removal from, and replacement to, the base and handle with at least one connector, and, when the vessel is mounted to the base and handle, to permit a human hand gripping the handle to simultaneously lift the base, handle and vessel as a unified structure.

25. A portable measuring device for food preparation, the device comprising:
   a. a vessel having sidewalls and a floor that define a chamber capable of containing a food material, the sidewalls defining an open top that is adapted to permit the passage of the food material into the chamber;
   b. a base portion removably mounted to the vessel;
   c. a hand-grippable handle portion removably mounted to the vessel; and
   d. a digital measuring component in at least one of the portions removably mounted to the vessel and including
      i. at least one mass sensor for measuring the mass of at least the food material in the chamber;
      ii. at least one processor connected to said at least one mass sensor; and
      iii. an output unit connected to the processor to output human-perceptible information related to the volume of the food material in the chamber to the user.

26. A portable measuring device for food preparation, the device comprising:
   a. a vessel having sidewalls and a floor that define a chamber containing a food material, the sidewalls defining an open top that permits the passage of the food material into the chamber;
   b. a base portion removably mounted to the vessel;
   c. a hand-grippable handle portion removably mounted to the vessel; and
   d. a digital measuring component in at least one of the portions removably mounted to the vessel and including
      i. at least one mass sensor for measuring the mass of at least the food material in the chamber;
      ii. at least one processor connected to said at least one mass sensor; and
      iii. an output unit connected to the processor to output human-perceptible information related to the volume of the food material in the chamber to the user.

27. A method of using a portable measuring device for food preparation, the method comprising:
   a. placing a food material in a chamber of a vessel defined by sidewalls and a floor, the sidewalls defining an open top through which the food material is placed into the chamber;
   b. removably mounting a handle portion to the vessel;
   c. removably mounting a base portion to the vessel;
   d. mounting a digital measuring component in at least one of the portions removably mounted to the vessel, the digital measuring component including
      i. at least one mass sensor for measuring the mass of at least the food material;
      ii. at least one processor connected to said at least one mass sensor; and
      iii. an output unit connected to the processor to output human-perceptible information related to the volume of the food material to the user;
   e. disposing the measuring device on a substantially horizontal surface;
   f. sensing the mass of at least the food material; and
   g. displaying at least one characteristic of the food material on the output unit.

* * * * *